(12) United States Patent
Kato et al.

(10) Patent No.: US 6,687,214 B2
(45) Date of Patent: Feb. 3, 2004

(54) RECORDING MEDIUM AND APPARATUS AND METHOD FOR MANUFACTURING THE SAME

(75) Inventors: Masahiro Kato, Tokorozawa (JP); Eiji Muramatsu, Tokorozawa (JP); Atsushi Yamaguchi, Tokorozawa (JP); Shoji Taniguchi, Tokorozawa (JP); Seiro Oshima, Yamanashi (JP); Makoto Matsukawa, Yamanashi (JP); Takao Tagiri, Koufu (JP); Kazuhiro Yamato, Koufu (JP); Tatsuhiro Yone, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 253 days.

(21) Appl. No.: 09/923,804

(22) Filed: Aug. 8, 2001

(65) Prior Publication Data

US 2002/0024925 A1 Feb. 28, 2002

(30) Foreign Application Priority Data

Aug. 10, 2000 (JP) ........................ 2000-242376

(51) Int. Cl.⁷ .................................. G11B 7/24
(52) U.S. Cl. .................................. 369/275.4
(58) Field of Search ........................ 369/275.4, 275.3, 369/275.2, 13.55, 13.54, 277, 278, 279; 428/64.4, 64.1, 64.3; 430/320, 321

(56) References Cited

U.S. PATENT DOCUMENTS

| 5,185,732 | A | | 2/1993 | Ogawa et al. | |
|---|---|---|---|---|---|
| 5,604,726 | A | * | 2/1997 | Karube | 369/275.4 |
| 5,852,599 | A | * | 12/1998 | Fuji | 369/275.4 |
| 5,933,411 | A | * | 8/1999 | Inui et al. | 369/275.4 |
| 6,075,761 | A | | 6/2000 | Akiyama et al. | |
| 6,128,271 | A | | 10/2000 | Ohta | |
| 6,404,729 | B1 | * | 6/2002 | Yamaoka et al. | 369/275.4 |
| 6,490,240 | B1 | * | 12/2002 | Usami | 369/275.4 |
| 6,504,815 | B1 | * | 1/2003 | Fujii et al. | 369/275.4 |
| 6,545,972 | B1 | * | 4/2003 | Kato et al. | 369/124.12 |
| 6,590,857 | B2 | * | 7/2003 | Ohkubo et al. | 369/275.4 |
| 6,594,224 | B2 | * | 7/2003 | Muramatsu et al. | 369/275.4 |
| 6,599,607 | B1 | * | 7/2003 | Iakishita et al. | 428/64.4 |
| 2002/0018439 | A1 | * | 2/2002 | Kato et al. | 369/275.4 |
| 2002/0023965 | A1 | * | 2/2002 | Kato et al. | 369/275.4 |

FOREIGN PATENT DOCUMENTS

JP 2000-353321 12/2000

* cited by examiner

*Primary Examiner*—Tan Dinh
(74) *Attorney, Agent, or Firm*—Morgan, Lewis Bockius LLP (57) ABSTRACT

A recording medium includes pairs of groove tracks and land tracks having periodically formed bent portion provided side by side on a substrate, a plurality of land prepits previously formed on the land tracks and carrying information about the groove tracks, and a recording layer formed on at least the groove tracks and the land tracks. The land prepits have a radius of mean curvature smaller than a radius of mean curvature of sides of the groove tracks in land-prepit absent regions of the land prepits and are defined by curved surfaces continuously extending from the sides of the groove tracks. Those sides of the groove tracks which face the continuous curved surfaces of the land prepits are curved surfaces that stricture the groove tracks. The depth of the land prepit is larger than that of the groove track.

18 Claims, 11 Drawing Sheets

RECORDING MEDIUM AND APPARATUS AND METHOD FOR MANUFACTURING THE SAME

BACKGROUND OF THE INVENTION

1. Field of the Invention

The present invention relates to a recording medium, such as an optical disc or optical card and an apparatus and method for manufacturing the recording medium.

2. Description of the Related Art

Recordable recording media, particularly a write once DVD-R (Digital Versatile Disc-Recordable) and rewritable DVD-RW (Digital Versatile Disc-Re-Writable) (hereinafter those media will be generically called DVDs) have already been manufactured. Previously recorded on a DVD are address information needed to look for a target position at the time of recording data, such as image information, and rotation control information, such as a wobbling signal, which is used in controlling the rotation of a disc. (Hereinafter, this information will be generically called pre-information.)

The rotation control information is recorded by previously wobbling data-recording tracks (groove tracks or land tracks) to a waveform of a given amplitude at a predetermined frequency (wobbling frequency) in the preformat phase at the time of manufacture.

At the time of actually recording data on a DVD, therefore, the wobbling frequency of the wobbled tracks is detected, a reference clock for controlling the rotation of the DVD is extracted based on the wobbling frequency, and a drive signal for controlling the rotation of the spindle motor that rotates the DVD based on the extracted reference clock and a recording clock signal including timing information which is synchronous with the rotation of the DVD are generated.

Further, address information indicating an address on the DVD that is needed at the time of recording data is recorded by forming prepits corresponding to the pre-information. The address information is formed on a track lying between two tracks (e.g., a land track). Further, the prepits are formed nearly uniformly over the entire surface of the DVD so that the reference clock can be reproduced even from the prepits as needed.

Figure 1:
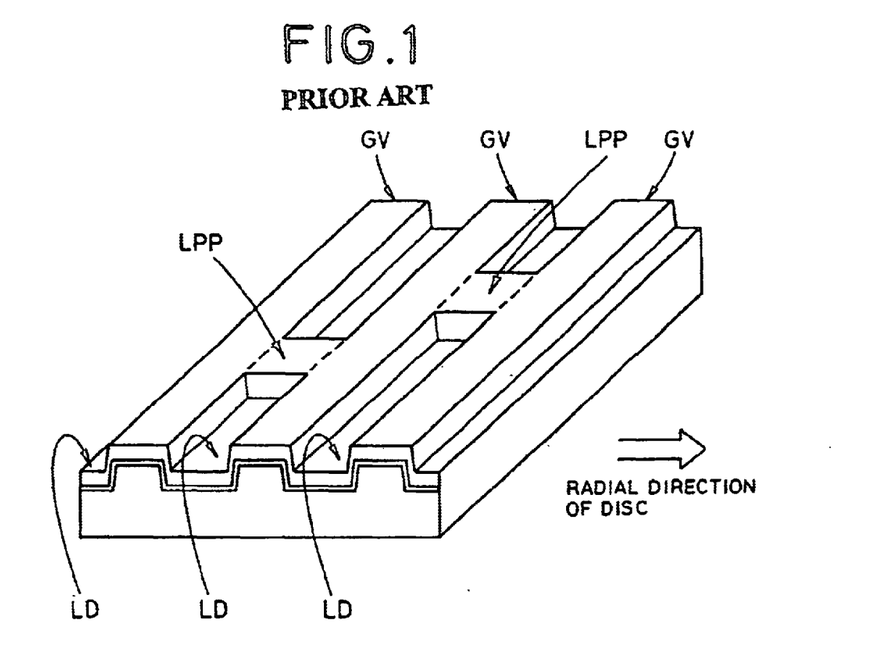
FIG. 1 is a partly cutaway perspective view of a DVD.

FIG. 1 shows one example of a recording layer on a DVD and the cross section of the DVD. As illustrated, convex groove tracks GV and recessed land tracks LD are previously and alternately formed on the recording layer of, for example, a phase change material on the DVD spirally or concentrically. That is, pairs of both tracks are repeatedly laid side by side.

Formed on the land tracks LD beforehand are addresses indicating positions on the groove tracks GV and related information, such as a plurality of land prepits LPP which carry the recording timing. Each of the land prepits LPP is formed in such a way as to couple both adjoining groove tracks GV, and the surface of each land prepit LPP is level with the surfaces of the associated groove tracks GV.

FIG. 1 shows a mode before data to be recorded (audio data, video data and computer data) by an information recording and reproducing apparatus is recorded. While FIG. 1 linearly shows the individual groove tracks GV, the groove tracks GV are actually wobbled at a frequency corresponding to the rotational speed of the DVD. That is, pairs of the land tracks LD and groove tracks GV are provided side by side while being bent periodically.

Figure 2:
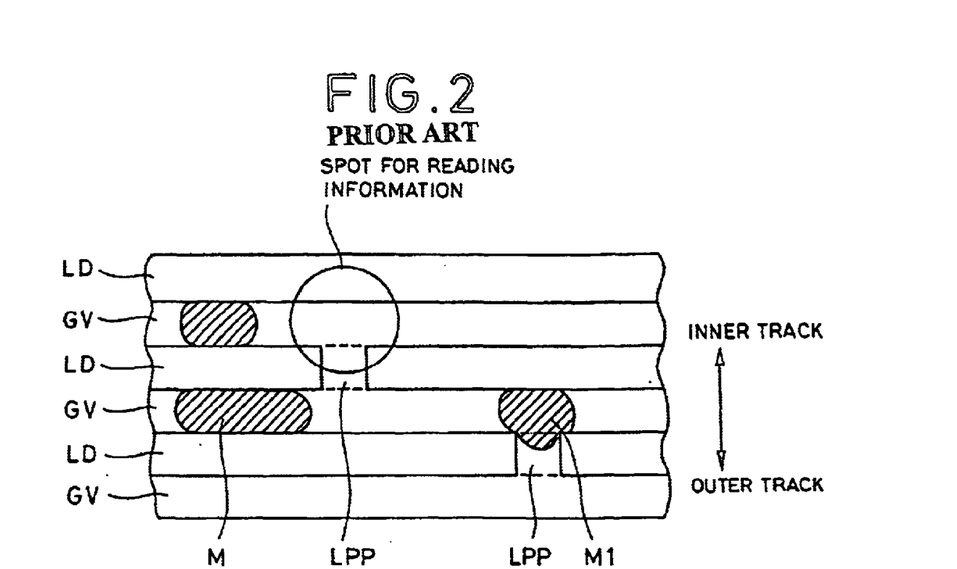
FIG. 2 is a partial plan view of the DVD.

The information recording and reproducing apparatus that records data on a DVD irradiates and focuses a recording light beam according to data on a groove track GV as shown in FIG. 2 while identifying a position on the groove track GV by detecting a land prepit LPP from the DVD. At this time, the portion where the recording light beam has been irradiated is heated, thereby forming a record marker portion M whose reflectance differs from the ambient reflectance on that portion of the groove track GV. As a land prepit LPP that carries information, such as an address, about one groove track is formed on the outer track side of the groove track, a land prepit LPP on the outer track side of each track is detected as shown in FIG. 2.

Figure 3:
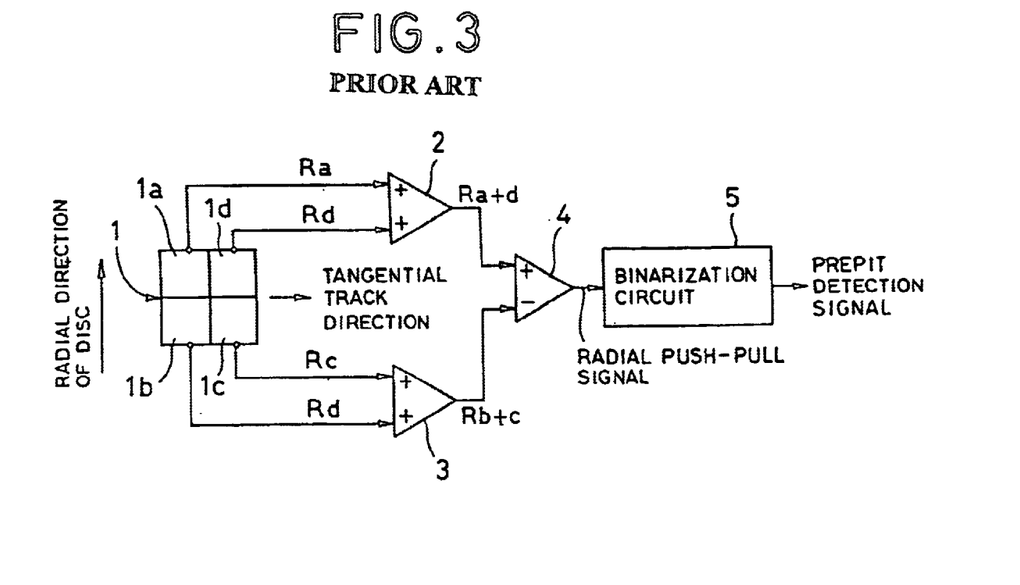
FIG. 3 is a block diagram showing the structure of a prepit detecting unit.

The information recording and reproducing apparatus has a prepit detecting unit which detects a land prepit LPP. The prepit detecting unit includes a 4-quadrant photodetector 1 as shown in FIG. 3. The 4-quadrant photodetector 1 is comprised of a photoelectric converting device having four light-receiving surfaces $1a$ to $1d$ separated into four segments by a direction along the groove tracks GV of the DVD and a direction perpendicular to the groove tracks. The light-receiving surfaces $1a$ and $1d$ are positioned on the outer track side of the DVD while the light-receiving surfaces $1b$ and $1c$ are positioned on the inner track side of the DVD.

A read light beam generator irradiates a read light beam on the DVD that is rotated by the spindle motor, thereby forming a beam spot on the recording layer. The photoelectric converting device detects reflected light of the information reading spot from the DVD at the four light-receiving surfaces $1a$–$1d$ and outputs reception signals Ra to Rd or electric signals corresponding to the amounts of light respectively detected by the light-receiving surfaces $1a$–$1d$. The reception signals Ra and Rd associated with the light-receiving surfaces $1a$ and id positioned on the outer track side of the DVD are supplied to an adder 2, and the reception signals Rb and Rc associated with the light-receiving surfaces $1b$ and $1c$ positioned on the inner track side of the DVD are supplied to an adder 3. The adder 2 adds the light-receiving surfaces Ra and Rd, and the adder 3 adds the light-receiving surfaces Rb and Rc. Further, a subtracter 4 subtracts the output signal of the adder 3 from the output signal of the adder 2, and provides an output signal as a radial push-pull signal.

Figure 4:
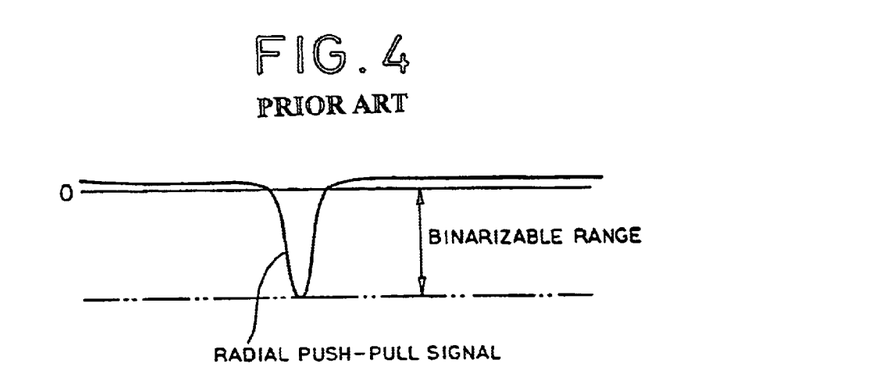
FIG. 4 is a graph showing a radial push-pull signal.

When the irradiated beam spot is on a position centering a groove track GV carrying no data in center and including a land prepit LPP as shown in FIG. 2, the diffraction of the light beam reduces the amount of reflected light to the light-receiving surfaces $1a$ and $1d$ of the photodetector 1 and increases the amount of reflected light to the light-receiving surfaces $1b$ and $1c$. As a result, the level of the output signal of the adder 2 falls below the level of the output signal of the adder 3. Therefore, the radial push-pull signal output from the subtracter 4 in association with the position of the land prepit LPP has a waveform with a sharp trough as shown in FIG. 4. The radial push-pull signal is supplied to a binarization circuit 5 and is binarized with a predetermined threshold value to detect the land prepit LPP.

When the recording light beam is irradiated on a land prepit LPP to form the data-carrying record marker portion M, the heat generated by the irradiation of the recording light beam is transferred to a part of the land prepit LPP from the groove track GV. This forms a record marker portion M1 with a larger area than that of the record marker portion M of the groove track in a land-prepit absent region as shown in FIG. 2.

When information data is reproduced from the data-recorded DVD, therefore, the waveform of a read signal obtained at the time of reading the record marker portion M1 near the land prepit LPP may have distortion, which leads to a higher read error ratio.

OBJECT AND SUMMARY OF THE INVENTION

The present invention is made to overcome such a conventional problem and therefore an object of the present invention is to provide a recording medium which provides read signals with less waveform distortion at the time of reproducing information, and an apparatus and method for manufacturing the recording medium.

A recording medium according to the present invention comprises:

pairs of groove tracks and land tracks provided side by side while being bent periodically;

a plurality of land prepits previously formed on said land tracks and carrying information about said groove tracks; and a recording layer formed on at least said groove tracks and said land tracks, wherein said land prepits have a radius of mean curvature smaller than a radius of mean curvature of sides of said groove tracks in land-prepit absent regions where said land prepits do not exist and being defined by curved surfaces continuously extending from said sides of said groove tracks, wherein those sides of said groove tracks which face said continuous curved surfaces of said land prepits are curved surfaces that stricture said groove tracks, and wherein a depth of the land prepit is larger than that of the groove track.

In one aspect of the recording medium according to the invention, a depth ratio R of said land prepit to said groove track is in a range of $1.0 < R \leq 2.0$.

In another aspect of the recording medium according to the invention, said groove tracks have sides of a first amplitude and said land prepits have sides of a second amplitude greater than said first amplitude.

In another aspect of the recording medium according to the invention, said land prepits are located apart from adjoining groove tracks.

In a further aspect of the recording medium according to the invention, a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

In a still further aspect of the recording medium according to the invention, said predetermined value is 0.05 and said predetermined range is 0.18 to 0.27.

A method of manufacturing a recording medium according to the present invention, in which the recording medium has pairs of groove tracks and land tracks provided side by side while being bent periodically, a plurality of land prepits previously formed on said land tracks and carrying information about said groove tracks, and a recording layer formed on at least said groove tracks and said land tracks, comprises the steps of:

forming said groove tracks extending by irradiating a spot of a cutting light beam, which moves relatively to a recording master disc, on a photoresist layer formed on said recording master disc; and increasing an intensity of said cutting light beam and simultaneously shifting said spot of said cutting light beam in a direction perpendicular to a direction in which said groove tracks extend, returning said shifted spot to a position where said groove tracks should extend, thereby forming said land prepits having sides defined by curved surfaces continuously extending from sides of said groove tracks, and making those sides of said groove tracks which face said sides of said land prepits having curved surfaces that stricture said groove tracks to make a depth of the land prepit larger than that of the groove track.

In one aspect of the method according to the invention, a depth ratio R of said land prepit to said groove track is in a range of $1.0 < R \leq 2.0$.

In another aspect of the method according to the invention, said sides of said land prepits have a radius of mean curvature smaller than a radius of mean curvature of sides of said groove tracks in non-present regions of said land prepits.

In another aspect of the method according to the invention, said spot is caused to wobble with a first amplitude in said step of forming said groove tracks, and said spot is caused to wobble with a second amplitude greater than said first amplitude in said step of forming curved sides which stricture said groove tracks and curved sides which define said land prepits.

In a further aspect of the method according to the invention, a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

In a still further aspect of the method according to the invention, said predetermined value is 0.05 and said predetermined range is 0.18 to 0.27.

An apparatus for manufacturing a recording medium according to the present invention, in which the recording medium has pairs of groove tracks and land tracks provided side by side while being bent periodically, a plurality of land prepits previously formed on said land tracks and carrying information about said groove tracks, and a recording layer formed on at least said groove tracks and said land tracks, comprises:

a track forming section for forming said groove tracks extending by irradiating a spot of a cutting light beam, which moves relatively to a recording master disc, on a photoresist layer formed on said recording master disc; and a land-prepit forming section for increasing an intensity of said cutting light beam and simultaneously shifting said spot of said cutting light beam in a direction perpendicular to a direction in which said groove tracks extend, returning said shifted spot to a position where said groove tracks should extend, thereby forming said land prepits having sides defined by curved surfaces continuously extending from sides of said groove tracks, and making those sides of said groove tracks which face said sides of said land prepits having curved surfaces that stricture said groove tracks to make a depth of the land prepit larger than that of the groove track.

In one aspect of the apparatus according to the invention, a depth ratio R of said land prepit to said groove track is in a range of $1.0 < R \leq 2.0$.

In another aspect of the apparatus according to the invention, said sides of said land prepits have a radius of mean curvature smaller than a radius of mean curvature of sides of said groove tracks in non-present regions of said land prepits.

In another aspect of the apparatus according to the invention, said spot is caused to wobble with a first amplitude in said track forming section, and said spot is caused to wobble with a second amplitude greater than said first amplitude in said land-prepit forming section.

In a further aspect of the apparatus according to the invention, a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

In a still further aspect of the apparatus according to the invention, said predetermined value is 0.05 and said predetermined range is 0.18 to 0.27.

DETAILED DESCRIPTION OF THE PREFERRED EMBODIMENTS

A preferred embodiment of the present invention will now be described in detail referring to the accompanying drawings.

Figure 5:
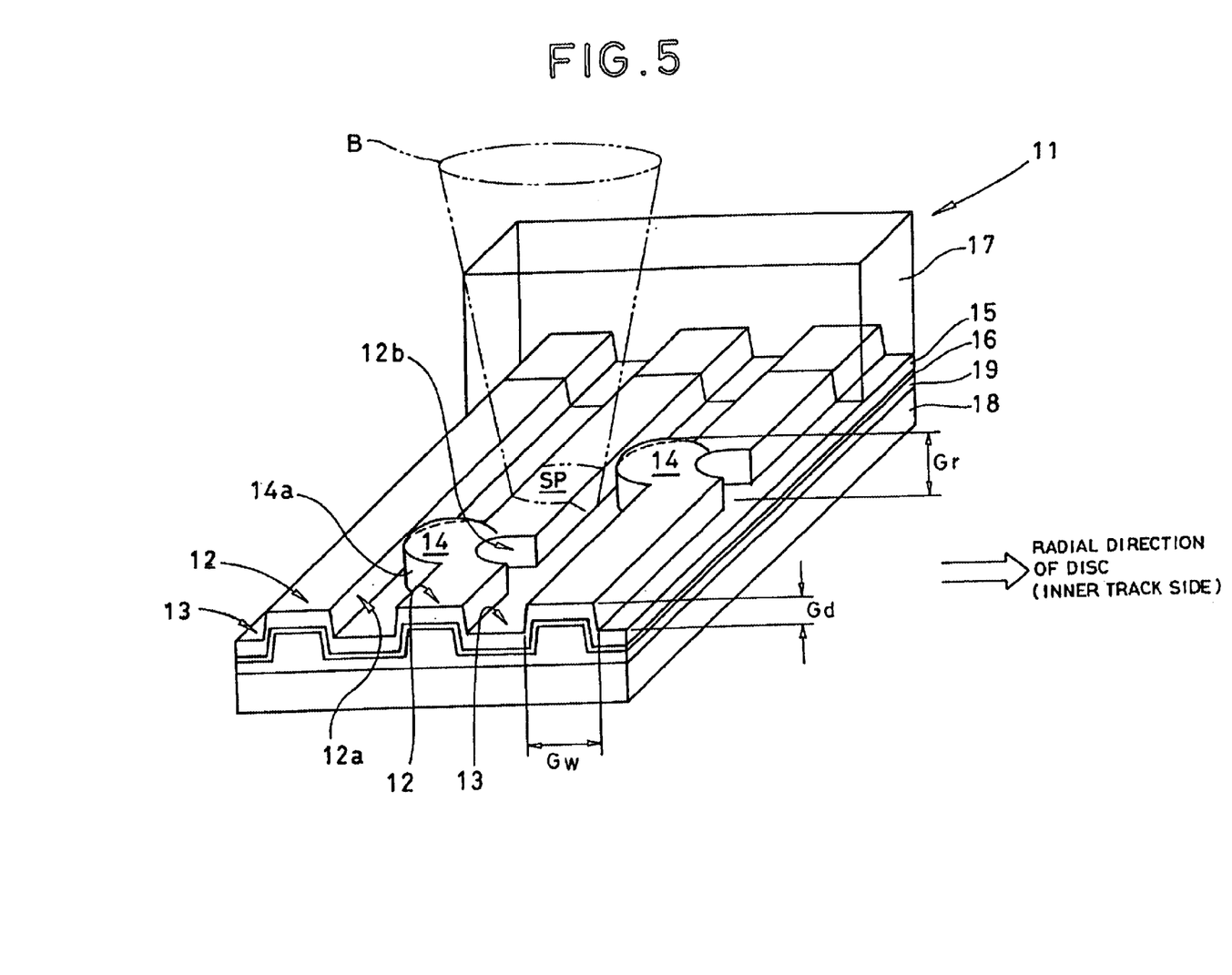
FIG. 5 is a partly cutaway perspective view of a DVD according to the present invention.

FIG. 5 shows an example of a rewritable phase change type optical disc. The optical disc (DVD-RW) 11 includes a recording layer 15 which has a medium layer formed of a phase change material, such as Ag—In—Sb—Te, and glass protection layers of, for example, ZnS—SiO$_2$ sandwiching the medium layer. Groove tracks 12 and land tracks 13 are formed on the recording layer 15. The land and groove pair provided side by side guides a laser beam B as reproduction or recording light. The optical disc 11 has a reflection layer 16 for reflecting the light beam B, a transparent substrate (polycarbonate) 18 and an adhesive layer 19. Provided on the beam incident side is a transparent film (polycarbonate) 17 which protects those layers.

Figure 6:
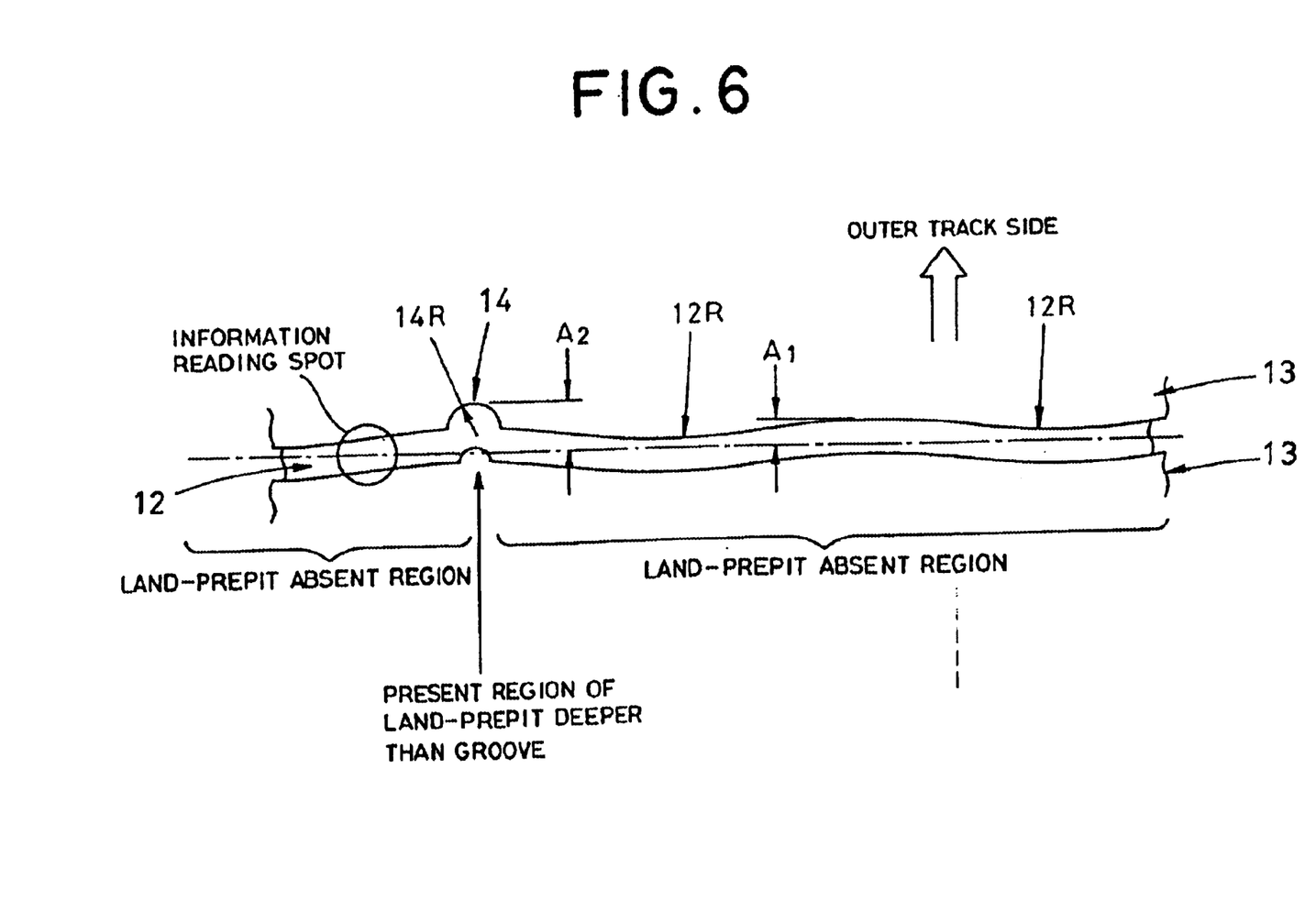
FIG. 6 is a partial plan view showing a groove formed on a DVD according to the present invention.
Figure 7:
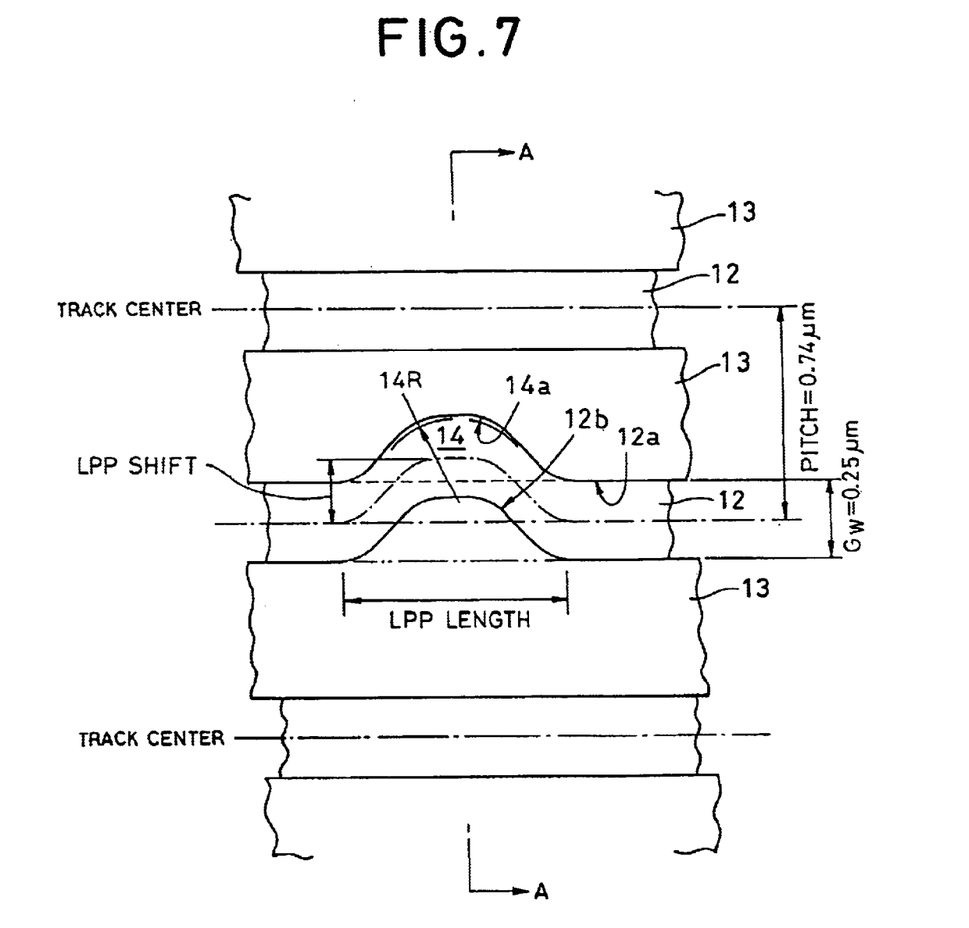
FIG. 7 is a partially enlarged plan views showing the DVD according to the present invention.

Land prepits 14 corresponding to pre-information are formed beforehand on the land tracks 13 on the optical disc 11. As shown in FIG. 5, a side 14a of each land prepit 14 has a curved surface of a radius of mean curvature smaller than the radius of mean curvature of a side 12a of each groove track 12 in a land-prepit absent region where no land prepits exist and is so formed as to be continual from the side 12a of the groove track 12 in the land-prepit absent region. As the groove track 12 is wobbled at a predetermined frequency, the side of the groove track 12 is cut nearly flat or cut with a relatively gentle curve of a large radius of curvature 12R on the flat surface of the disc as shown in FIG. 6 and part of the pre-information is recorded as a wobbling frequency in the land-prepit absent region. Therefore, the radius of mean curvature of the side 12a of the groove track 12 becomes relatively large. According to this embodiment, the side 14a of the land prepit 14 is cut with a sharp curve (the radius of curvature 14R of the land prepit 14) considerably smaller than the large radius of curvature 12R of the groove track 12 as shown in FIGS. 6 and 7. Apparently, each groove track 12 has a side of a first amplitude A1 from a center line (two-dot chain line), and each land prepit 14 has a side of a second amplitude A2 greater than the first amplitude A1.

A side 12b of the groove track 12 which faces the side 14a of the land prepit 14 is a curved surface stricturing the groove track 12 or making it narrow. It is preferable to form the side 12b of the groove track 12 in such a way as to be strictured to the extent where it does not reach the extension line (indicated by the broken line in FIG. 7) of the side of the opposing groove track 12. This is because when a record marker M to be recorded later is formed in a portion adjacent to the land prepit, the amount of reflected light from the record marker M decreases.

Figure 8:
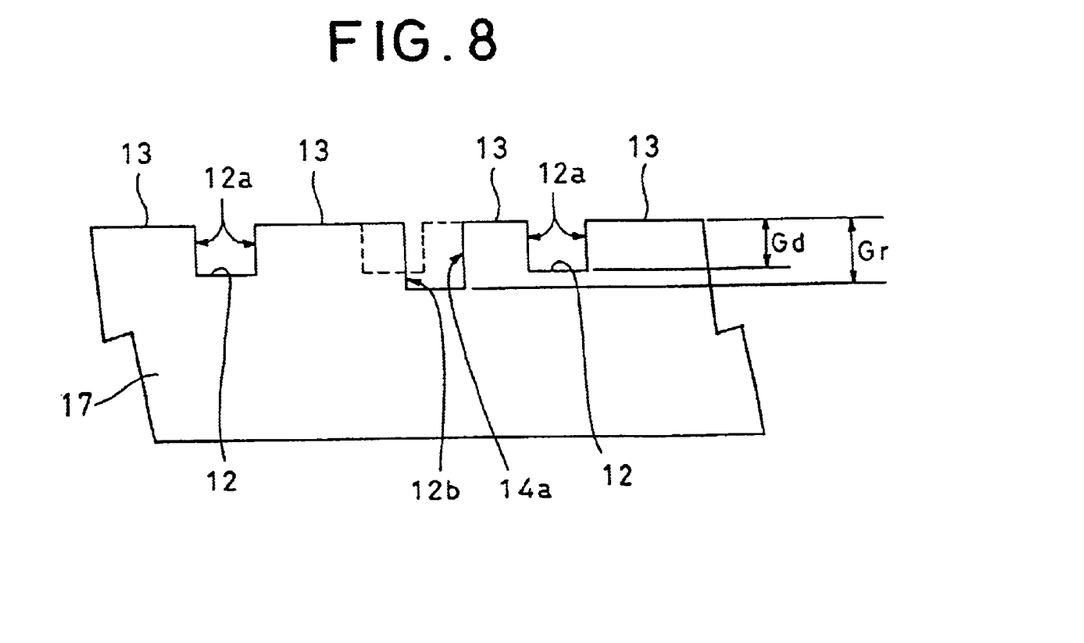
FIG. 8 is a cross sectional view taken along a line A—A shown in FIG. 7.

A further feature of the present embodiment is that, as shown in FIGS. 5 and 8, the depth Gr of the land prepit 14 is greater than the depth Gd of the groove track 12. This feature improves the characteristic of reproduced signals i.e., reduction of RF offset level thereof is achieved.

The operation of the phase change type optical disc will now be discussed. At the time user data (data other than pre-information and such as image information to be recorded later by a user) is recorded on the optical disc 11, as shown in FIG. 5, the information recording apparatus extracts the wobbling frequency of the groove track 12 so that the optical disc 11 is rotated at a predetermined rotational speed. At the same time, the land prepit 14 is detected to acquire pre-information based on which the optimal power of the recording light beam B or the like is set. As the land prepit 14 is detected, address information indicating a position on the optical disc 11 where user data is to be recorded is acquired and the user data is recorded at the corresponding position based on the address information. The user data that is recorded on the optical disc 11 is recorded on the center line of the groove track 12 as a record marker portion having a different reflectance.

User data is recorded by forming a record marker portion corresponding to the user data on the groove track 12 by irradiating the light beam B in such a way that the center of the light beam B matches with the center of the groove track 12. At this time, the size of a beam spot SP is set so that part of the beam spot SP is irradiated on the land track 13 as well as the groove track 12.

Using reflected light of part of the beam spot SP irradiated on the land track 13, pre-information is acquired from the land prepit 14 by a radial push-pull system which uses a photodetector having its light-receiving surface split by a split line parallel to the tangential line (track direction), for example, as shown in FIG. 3, and a wobbling signal is extracted from the groove track 12 to detect a recording clock signal synchronous with the rotation of the disc.

One embodiment of the present invention will be described below in detail.

Figure 9:
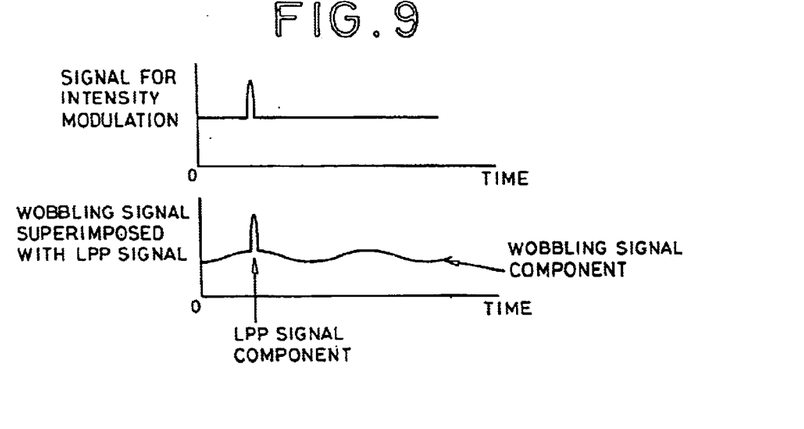
FIG. 9 is a block diagram showing an optical disc cutting apparatus for making a master disc for an optical disc according to the present invention.

FIG. 9 shows an optical disc cutting apparatus for making a master disc for a phase change type optical disc. A Kr laser oscillator 201 generates an exposure light beam. The light beam emitted from the laser oscillator 201 is reflected at reflection mirrors 203 and 204 and enters an objective lens 205. The light beam that has passed the objective lens 205 is irradiated on a recording master disc 206. An AO modulator (Acoustic Optical modulator) 207a is provided between a reflection mirror 202 and the reflection mirror 203 to modulate the light beam in accordance with a video signal and an audio signal to be recorded, which are supplied from an FM modulator 207.

A wedge prism whose non-parallel sides are light entering and emerging sides, AOD (Acoustic Optical Deflector) 207a or rotary mirror is used as the AO modulator. The AOD 207a receives, for example, a high-frequency electric signal having a center frequency of about 300 MHz and executes modulation by utilizing the phenomenon that the diffraction angle of the primary diffracted light is changed by varying the center frequency. The modulator of the type which uses a wedge prism or a rotary mirror controls the drive system, such as a DC motor, stepping motor or a piezo element, which rotates the wedge prism or rotary mirror, and uses the deflection of refracted light and reflected light. The modulated exposure light beam exposes a positive photoresist layer on the rotating recording master disc 206. A beam expander 208 is provided between the reflection mirrors 203 and 204 to enlarge the size of the light beam so that the beam filling the objective lens 205 enters the lens 205.

The optical disc cutting apparatus uses a focus servo optical system including an HeNe laser oscillator 210 in order to actuate the objective lens 205 for focus servo. The light beam emitted from the laser oscillator 210 is reflected by a reflection mirror 211 and a dichroic mirror 212 and merges with the exposure light beam. The resultant light beam enters the reflection mirror 204. The light beam that has passed the objective lens 205 is irradiated on the recording master disc 206. The wavelength and intensity of the focus light beam from the laser oscillator 210 are selected in such a way as not to expose the recording master disc 206. A polarized beam splitter 213 is provided between the reflection mirror 211 and the dichroic mirror 212. The reflected light from the recording master disc 206 passes the objective lens 205, is reflected by the reflection mirror 204 and the dichroic mirror 212 and is then reflected by the polarized beam splitter 213. The resultant reflected light is supplied to a 4-quadrant photodetector 215 via a cylindrical lens 214. Individual output signals of the photodetector 215 are supplied to a focus servo control circuit 216 which in turn drives an actuator 217 of the objective lens 205 according to the output signals of the photodetector 215.

The optical disc cutting apparatus further comprises a spindle servo circuit 221 that controls the rotation of a spindle motor 220 for rotating a turn table 219 which rotates the recording master disc 206 mounted thereon, and an optical head feeding servo circuit 223 that controls the rotation of a drive motor 222 which moves an optical head carrying an optical system or the like including the objective lens 205 in the radial direction of the recording master disc 206.

A controller 260 controls the laser oscillator 201, the FM modulator 207 and the servo systems 216, 221 and 223 in the optical disc cutting apparatus. Under the control of the controller 260, at lest one track is formed by exposing the positive photoresist layer of the recording master disc 206 with a single light beam modulated with the wobbling signal which is superimposed with an LPP signal, and etching and developing the exposed portion of the positive photoresist layer as a pit.

In other words, the optical disc cutting apparatus includes a track forming section for forming the groove track; and a land-prepit forming section for forming the land prepits having sides defined by curved surfaces continuously extending from sides of the groove track.

The controller 260 serving as the track forming section provides a signal for a constant output light-emission into the laser oscillator 201 during the wobbling signal component period within the wobbling signal which is superimposed with an LPP signal and input into the modulator 207. In addition, the controller 260 serving as the land-prepit forming section increases the intensity of the cutting light beam and, at the same time, shifts the irradiated spot of the cutting light beam in a direction perpendicular to the extending direction of the groove track 12 and then returns the shifted spot to a position where the groove track should extend to form the land prepits having sides defined by curved surfaces continuously extending from sides of the groove track, so that those sides of the groove track which face the side of the land prepit having a curved surface that strictures the groove track. At the same time, as apparent from two graphs as shown in the upper side of FIG. 9, the controller 260 further provides a signal for an intensity-modulation into the laser oscillator 201 synchronous with an LPP signal component period within the wobbling signal that is superimposed with an LPP signal to form a latent image in such a manner that the depth of the land prepit becomes grater than that of the groove track.

Thus, there will be described a recording method for manufacturing a master disc using such an optical disc cutting apparatus.

First, a blank recording master disc 206 having a photoresist layer 206b entirely formed on the major surface of a glass disc 206a is mounted on the turn table 219 of the laser cutting apparatus. The photoresist layer 206b is designed to have a thickness sufficient to reactive with radiation in order to avoid an insensitive condition that an irradiated light beam penetrates the layer. Then, as shown in FIG. 9, the table 219 is rotated and a cutting light beam La modulated with the wobbling signal that is superimposed with an LPP signal is focused on the photoresist layer 206b while moving the cutting light beam La on the master disc spirally or concentrically to form a latent image for the groove track 12. At a predetermined timing, the spot of the cutting light beam L a is shifted in a direction perpendicular to the longitudinal extending direction of the groove track 12, and then the shifted spot is returned to the position where the groove track 12 is to be extended, thus forming the latent image of the track on the photoresist layer 206b. Since the LPP-signal superimposed wobbling signal is used at this time, as shown in FIG. 6, the cutting light beam spot wobbles at a given interval with a first amplitude (A1) and a second amplitude (A2) greater than the first amplitude.

Figure 10:
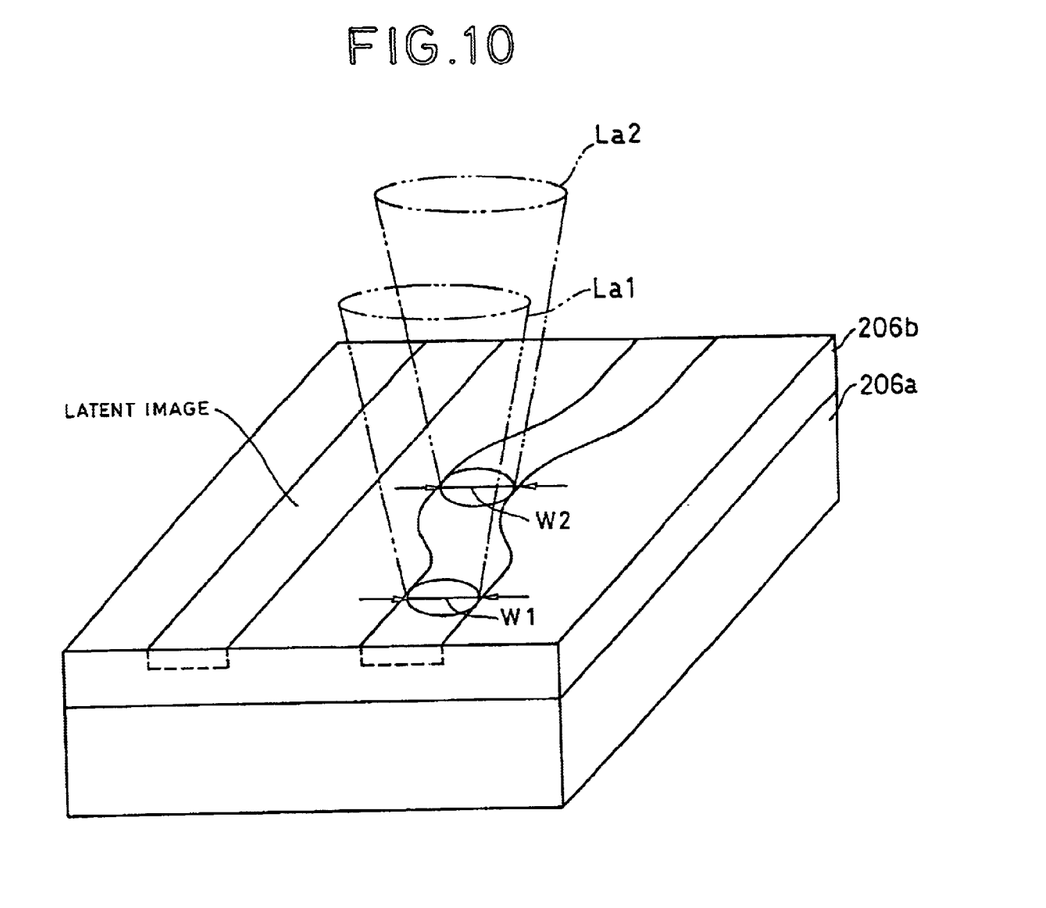
FIG. 10 is a partly cutaway perspective view showing a latent image formed on a pre-master disc according to the present invention.
Figure 11:
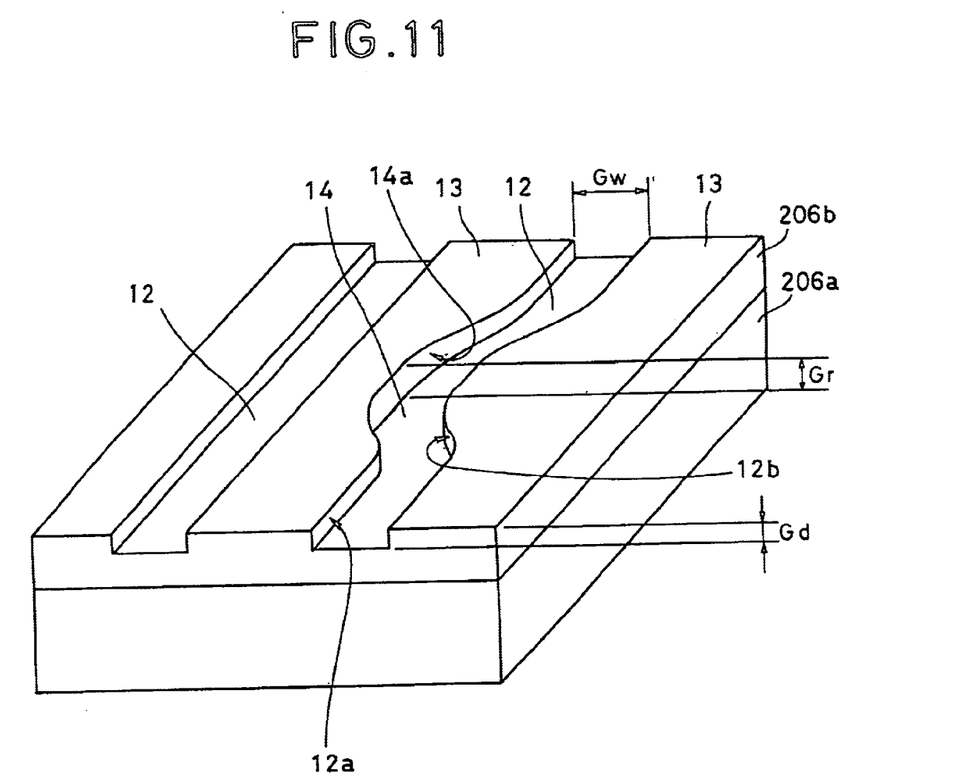
FIG. 11 is a partly cutaway perspective view of the master disc according to the present invention.

As shown in FIG. 10, the intensity-modulated light beam is irradiated onto the non-exposed to change the photoresist layer 206b partly. In the formation period of a wobbling groove track 12, a light beam La1 of low intensity is provided onto the photoresist layer 206b to penetrate into the surface thereof at a shallow point (depth Gd shown in FIG. 8). In the formation period of a land prepit 14, a light beam La2 with an intensity higher than that of the light beam La1 is provided onto the photoresist layer 206b to deeply penetrate into the surface thereof at a deep point (depth Gr shown in FIG. 8, Gr>Gd) near the glass disc 206a. The laser light beam has a Gaussian light intensity distribution with a central maximum intensity. The maximum intensity of the light beam La1 is lower than that of the light beam La2. Therefore, as shown in FIG. 10, the spot diameter of the light beam La1 on the photoresist layer 206b is smaller than that of the light beam La2, so that the latent image width W1 of the wobbling groove track 12 is narrower than the latent image width W2 of the land prepit 14. Furthermore, the wobbling portion of the groove track 12 may be different in depth and width from the land prepit 14. The width of the land prepit 14 may be wider than that of the wobbling portion of the groove track 12.

Next, the exposed photoresist master disc is placed in a developing apparatus (not shown) and is developed to remove the latent image portion, thus yielding a developed master disc.

As shown in FIG. 10, the land prepit 14 having a side defined by a continual curved surface from the side of the groove track 12 is formed on the master disc as a curved surface which strictures the groove track 12 opposing the side of the land prepit 14 by the side of the groove track 12. Accordingly, the side of the land prepit 14 has a radius of mean curvature smaller than the radius of mean curvature of the side of the groove track 12 in the land-prepit absent region. The land prepit 14 has the deep depth Gr and the wide width W2 in comparison with the wobbling groove track 12 of the shallow depth Gd and the narrow width W1.

Next, post baking is performed to fix the master disc after which a conductive film of nickel or silver is formed on the photoresist layer 206b by sputtering or vapor deposition and a nickel stamper is formed by, for example, electroforming. The nickel stamper is separated from the glass disc 206a. Using the stamper, a replica of a resin optical disc substrate having predetermined pre-information identical to the one shown in FIG. 10 is made by, for example, injection molding or a so-called 2P scheme.

A protection film, a medium layer of a phase change material, a protection film and a reflection film, for example, are formed on the obtained optical disc substrate one on another and another substrate is adhered to the resultant substrate by an adhesive layer, thus yielding an optical disc shown in FIG. 5.

A description will now be given of optimal values for the length of the land prepit 14 in a tangential-to-track direction (LPP length ($\mu$m)) and the amount of shift of the land prepits in the direction perpendicular to the tangential-to-track direction (LPP shift ($\mu$m)).

According to the recording medium of the present invention as described above, the land prepit 14 is formed by sharply shifting the groove track 12 in the direction perpendicular to the track extending direction. Therefore, the length and shift amount (shown in FIG. 7) of the land prepit 14 significantly influences a reproduction signal (RF signal) of a pit recorded on the groove track 12 as well as the detection signal level of the land prepit itself.

According to the recording format of a DVD, pits to be formed on a groove track can take any length from 3T to 11T and 14T. 3T to 11T are given mainly by an information signal undergone an 8–16 modulation while 14T is given by a sync signal (sync code) added to the head of each sync frame of an information signal.

As is well known, the width of a change in an RF signal with respect to a pit of 3T is the smallest. The present inventors confirmed through experiments that when the offset level of the RF signal (RF offset) by the land prepit became equal to or greater than 0.05, erroneous reading of the shortest 3T pit started. Note that level 1 indicates the level of the entire amount of reflected light when a non-recorded groove track is reproduced. The DVD format specifies the detection signal level of the land prepit (LPP level) to be 0.18 to 0.27.

Therefore, the length and shift amount of the land prepit according to the present invention are set in such a way that the RF offset is less than 0.05 and the LPP level lies in a range of 0.18 to 0.27.

Figure 12:
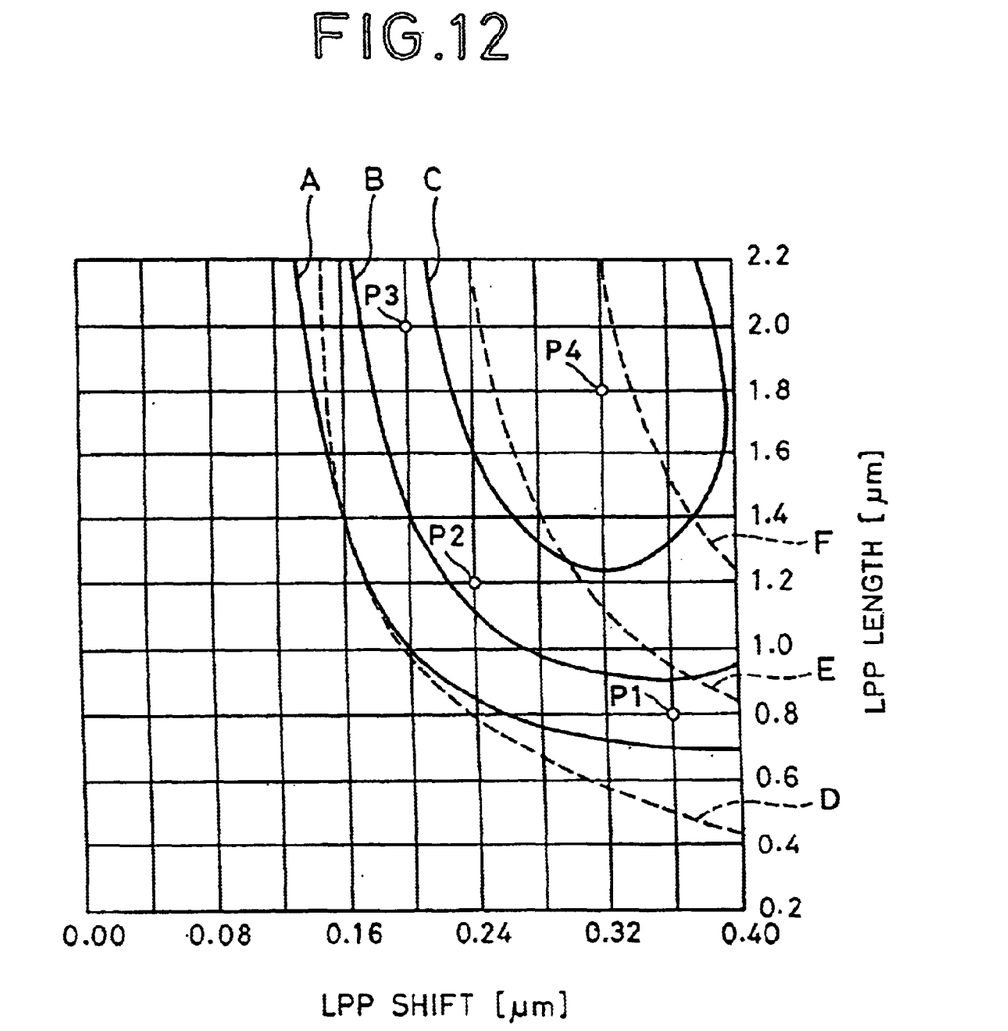
FIG. 12 is a graph showing the level range of a land prepit signal acquired from an optical disc according to the present invention.

FIG. 12 exemplifies the possible range of the length and shift amount of the land prepit 14 that satisfies those two conditions. The width, Gw, and the depth, Gd, of the groove track 12 in the diagram are respectively set to 0.25 $\mu$m and 0.030 $\mu$m.

In FIG. 12, a solid line A is a conditional line on which the LPP level becomes 0.18, a solid line B is a conditional line on which the LPP level becomes 0.21, and a solid line C is a conditional line on which the LPP level becomes 0.24. In this embodiment, there is no conditional line on which the LPP level becomes equal to or greater than 0.27. It is apparent that the possible range of the length and shift amount of the land prepit 14 that permits the LPP level to lie in a range of 0.18 to 0.27 is an area to the upper right of the solid line A.

A broken line D is a conditional line on which the RF offset becomes 0.02, a broken line E is a conditional line on which the RF offset becomes 0.05, and a broken line F is a conditional line on which the RF offset becomes 0.08. Therefore, the possible range of the length and shift amount of the land prepit 14 that permits the RF offset to be less than 0.05 is an area to the lower left of the solid line E.

In view of the above, the possible range of the length and shift amount of the land prepit 14 that satisfies the aforementioned two conditions (RF offset <0.05 and LPP level= 0.18 to 0.27) is an area lying between the solid line A and the broken line E in FIG. 12 and the length and shift amount of the land prepit 14 can be set freely within this area. For example, the length of the land prepit is set to 0.80 $\mu$m and the shift amount is set to 0.36 $\mu$m as indicated by a point P1, or the length of the land prepit is set to 1.2 $\mu$m and the shift amount is set to 0.24 $\mu$m as indicated by a point P2, or the length of the land prepit is set to 2.0 $\mu$m and the shift amount is set to 0.20 $\mu$m as indicated by a point P3.

Attention should be paid because the individual conditional lines shown in FIG. 12 shift in accordance with the values of the width Gw and the depth Gd of the groove track. The conditional lines A to C for the LPP level are shifted lower leftward in the diagram as the width Gw of the groove track is widened to 0.30 $\mu$m, 0.35 $\mu$m and so forth, and are shifted upper rightward in the diagram as the width Gw is made narrower. The conditional lines A to C are also shifted lower leftward in the diagram if the depth Gd of the groove track is made deeper than 0.25 $\mu$m, and are shifted upper rightward in the diagram as the depth Gd is made shallower. The conditional lines D to F for the RF offset are shifted upper rightward in the diagram as the width Gw of the groove track is made wider, and are shifted lower leftward in the diagram as the width Gw is made narrower. The conditional lines D to F are shifted lower leftward if the depth Gd of the groove track is made deeper, and are shifted upper rightward as the depth Gd is made shallower.

The preferred depth of the land prepit 14 will be described referring to the accompanying drawings.

The inventors have investigated the dependency of RF offset level of the resultant optical disc on a depth ratio of the land prepit 14 to the groove track 12 (known hereinafter as LPP/Gr depth ratio R). The level of RF offset depend on the LPP/Gr depth ratio R is measured at the similar condition to that of in FIG. 12, i.e., the groove track 12 has a width Gw=0.25 μm and a depth Gd=0.030 μm, and the length of the land prepit is set to 0.80 μm and the shift amount is set to 0.36 μm as indicated by a point P1 of FIG. 12, or the length of the land prepit is set to 1.2 μm and the shift amount is set to 0.24 μm as indicated by a point P2 of FIG. 12, or the length of the land prepit is set to 2.0 μm and the shift amount is set to 0.20 μm as indicated by a point P3 of FIG. 12.

Figure 13:
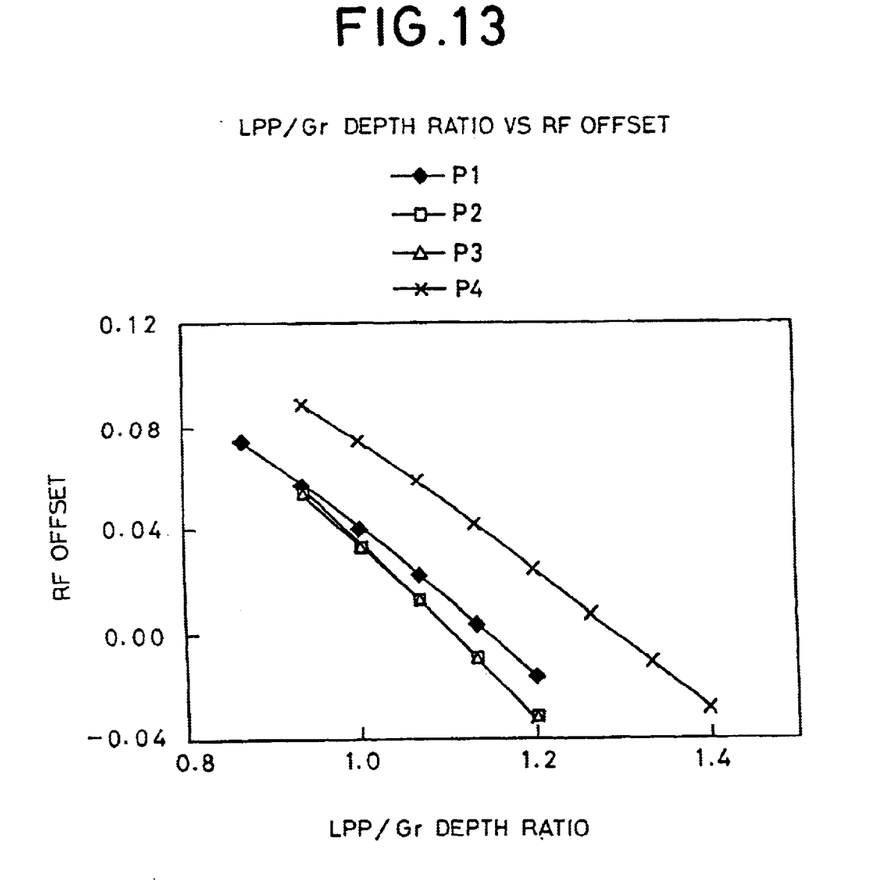
FIG. 13 is a graph showing a relationship between the RF signal level caused by a land prepit acquired and a depth ratio of land prepit/groove-depth of an optical disc according to the present invention.

FIG. 13 shows the dependency of RF offset level on LPP/Gr depth ratio R in which the point P1 condition curve lies on a RF offset of about 0.04 at 1 of the LPP/Gr depth ratio R, i.e., the depth of the land prepit 14 is the same as the groove track 12. The RF offset level decreases as the LPP/Gr depth ratio R increases and, when the LPP/Gr depth ratio R reaches at about 1.15, the RF offset level becomes zero.

The point P2 and P3 condition curves of FIG. 13 changes substantially similar to the point P1 condition curve. When the LPP/Gr depth ratios R reach at 1.0, the RF offset level becomes about 0.035. When the LPP/Gr depth ratios R reach at about 1, the RF offset level becomes about zero.

Even if the land prepit length and the shift amount are insufficient to the two conditions mentioned above (RF offset<0.05 and LPP level=0.18 to 0.27), e.g., the condition curve of point P4 of FIG. 12, the RF offset level may become zero by setting the LPP/Gr depth ratio R to about 1.3.

In addition, the result shown in FIG. 13 may be changed due to the depth and width of the groove track and the bottom shape of the land prepit. The bottom shape of the land prepit may be formed with a V shaped cross-section in an actual optical disc. To make the RF offset level zero, the LPP/Gr depth ratio R is in the range of 1.0<R≦2.0 preferably.

According to the present invention, as described above, the land prepits have a radius of mean curvature smaller than a radius of mean curvature of sides of the groove tracks in land-prepit absent regions where the land prepits do not exist and are defined by curved surfaces continuously extending from the sides of the groove tracks, and those sides of the groove tracks which face the continuous curved surfaces of the land prepits are curved surfaces that stricture the groove tracks. Since the depth of the land prepit is larger than that of the groove track, the RF offset level of the optical disc is reduced. This structure can ensure accurate detection of prepits.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2000-242376 which is hereby incorporated by reference.

What is claimed is:

1. A recording medium comprising:

a substrate;

pairs of groove tracks and land tracks having periodically formed bent portion provided side by side on said substrate;

a plurality of land prepits previously formed on said land tracks and carrying information about said groove tracks; and a recording layer formed on at least said groove tracks and said land tracks, wherein said land prepits have a radius of mean curvature smaller than a radius of mean curvature of sides of said groove tracks in land-prepit absent regions lacking said land prepits and being defined by curved surfaces continuously extending from said sides of said groove tracks, wherein sides of said groove tracks which face said continuous curved surfaces of said land prepits are curved surfaces that stricture said groove tracks, and wherein a depth of the land prepit is larger than that of the groove track.

2. A recording medium according to claim 1, wherein a depth ratio R of said land prepit to said groove track is in a range of 1.0<R≦2.0.

3. A recording medium according to claim 1, wherein said groove tracks have sides of a first amplitude and said land prepits have sides of a second amplitude greater than said first amplitude.

4. A recording medium according to claim 1, wherein said land prepits are located apart from adjoining groove tracks.

5. A recording medium according to claim 1, wherein a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

6. A recording medium according to claim 5, wherein said predetermined value is 0.05 and said predetermined range is 0.18 to 0.27.

7. A method of manufacturing a recording medium having pairs of groove tracks and land tracks having periodically formed bent portion provided side by side on a substrate, a plurality of land prepits previously formed on said land tracks and carrying information about said groove tracks, and a recording layer formed on at least said groove tracks and said land tracks, said method comprising the steps of:

forming said groove tracks by irradiating a spot of a cutting light beam, which moves relatively to a recording master disc, on a photoresist layer formed on said recording master disc; and increasing an intensity of said cutting light beam and simultaneously shifting said spot of said cutting light beam in a direction perpendicular to a direction in which said groove tracks extend, returning said shifted spot to a position where said groove tracks should extend, thereby forming said land prepits having sides defined by curved surfaces continuously extending from sides of said groove tracks, and making sides of said groove tracks which face said sides of said land prepits having curved surfaces that stricture said groove tracks to make a depth of the land prepit larger than that of the groove track.

8. A method according to claim 7, wherein a depth ratio R of said land prepit to said groove track is in a range of $1.0 < R \leq 2.0$.

9. A method according to claim 7, wherein said sides of said land prepits have a radius of mean curvature smaller than a radius of mean curvature of sides of said groove tracks in non-present regions of said land prepits.

10. A method according to claim 7, wherein said spot is caused to wobble with a first amplitude in said step of forming said groove tracks, and said spot is caused to wobble with a second amplitude greater than said first amplitude in said step of forming curved sides which stricture said groove tracks and curved sides which define said land prepits.

11. A method according to claim 7, wherein a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

12. A method according to claim 11, wherein said predetermined value is 0.05 and said predetermined range is 0.18 to 0.27.

13. An apparatus for manufacturing a recording medium having pairs of groove tracks and land tracks having periodically formed bent portion provided side by side on a substrate, a plurality of land prepits previously formed on said land tracks and carrying information about said groove tracks, and a recording layer formed on at least said groove tracks and said land tracks, said apparatus comprising:

a track forming section for forming said groove tracks by irradiating a spot of a cutting light beam, which moves relatively to a recording master disc, on a photoresist layer formed on said recording master disc; and a land-prepit forming section for increasing an intensity of said cutting light beam and simultaneously shifting said spot of said cutting light beam in a direction perpendicular to a direction in which said groove tracks extend, returning said shifted spot to a position where said groove tracks should extend, thereby forming said land prepits having sides defined by curved surfaces continuously extending from sides of said groove tracks, and making sides of said groove tracks which face said sides of said land prepits having curved surfaces that stricture said groove tracks to make a depth of the land prepit larger than that of the groove track.

14. An apparatus according to claim 13, wherein a depth ratio R of said land prepit to said groove track is in a range of $1.0 < R \leq 2.0$.

15. An apparatus according to claim 13, wherein said sides of said land prepits have a radius of mean curvature smaller than a radius of mean curvature of sides of said groove tracks in non-present regions of said land prepits.

16. An apparatus according to claim 13, wherein said spot is caused to wobble with a first amplitude in said track forming section, and said spot is caused to wobble with a second amplitude greater than said first amplitude in said land-prepit forming section.

17. An apparatus according to claim 13, wherein a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

18. An apparatus according to claim 17, wherein said predetermined value is 0.05 and said predetermined range is 0.18 to 0.27.

* * * * *